US012678977B2

(12) United States Patent
Merz et al.

(10) Patent No.: US 12,678,977 B2
(45) Date of Patent: Jul. 14, 2026

(54) END EFFECTOR, ROBOT, SYSTEM AND METHOD FOR HANDLING OBJECTS IN AN ISOLATOR

(71) Applicant: Groninger & Co. GmbH, Crailsheim (DE)

(72) Inventors: Armin Merz, Ellwangen (DE); Roland Engelhard, Aurach-Weinberg (DE); Jens Pommert, Gerabronn (DE)

(73) Assignee: GRONINGER & CO. GMBH, Crailsheim (DE)

( * ) Notice: Subject to any disclaimer, the term of this patent is extended or adjusted under 35 U.S.C. 154(b) by 1017 days.

(21) Appl. No.: 17/879,738

(22) Filed: Aug. 2, 2022

(65) Prior Publication Data

US 2022/0371205 A1     Nov. 24, 2022

Related U.S. Application Data

(63) Continuation of application No. PCT/EP2021/052444, filed on Feb. 2, 2021.

(30) Foreign Application Priority Data

Feb. 4, 2020    (DE) ..................... 10 2020 102 761.3

(51) Int. Cl.
*B25J 15/00*          (2006.01)
(52) U.S. Cl.
CPC .................................. *B25J 15/0052* (2013.01)
(58) Field of Classification Search
CPC ................ B25J 15/0052; B25J 15/0057; B25J 15/0061; B65H 67/04

(Continued)

(56) References Cited

U.S. PATENT DOCUMENTS 3,968,885 A * 7/1976 Hassan ................ B25J 15/0052
                                                        414/217
4,775,271 A * 10/1988 Maccaferri ............ B65H 67/04
                                                        242/473.9

(Continued)

FOREIGN PATENT DOCUMENTS

CN          108214539 A      6/2018
DE      102016111125 A1    12/2017

(Continued)

OTHER PUBLICATIONS

Examination Report issued by the German Patent Office for application DE 10 2020 102 761.3 dated Dec. 17, 2020; 16 pages.

(Continued)

*Primary Examiner* — Paul T Chin
(74) *Attorney, Agent, or Firm* — Reising Ethington P.C.

(57)          ABSTRACT

An end effector for handling objects in an isolator. The end effector comprises a first receptacle for a first object, a second receptacle for a second object, and a displacement member, wherein the receptacles are arranged on opposite sides of the end effector. Each receptacle is displaced between a receiving position, in which the respective object can be received, and a gripping position, in which the respective object can be gripped. Each receptacle has a first gripping portion, wherein the first gripping portion of the first receptacle is located at a first end of the displacement member and the first gripping portion of the second receptacle is located at an opposite second end of the displacement member. The displacement member is displaceable such that the first and second receptacles can each be displaced between the receiving and gripping positions. A robot, a system and a method are also disclosed.

28 Claims, 11 Drawing Sheets

(58) Field of Classification Search
USPC .............................................. 294/86.4, 119.1
See application file for complete search history.

(56) References Cited

U.S. PATENT DOCUMENTS

| | | | | |
|---|---|---|---|---|
| 4,845,834 | A * | 7/1989 | Watson ................ | B23Q 3/1554 |
| | | | | 483/34 |
| 6,393,694 | B2 * | 5/2002 | Roovers ............. | H05K 13/0408 |
| | | | | 294/86.4 |
| 7,604,584 | B1 | 10/2009 | Wu et al. | |
| 7,789,443 | B2 | 9/2010 | Gillespie et al. | |
| 8,297,671 | B2 * | 10/2012 | Knieling .............. | B65G 47/847 |
| | | | | 294/90 |
| 8,857,875 | B2 | 10/2014 | Suyama | |
| 2009/0223592 | A1 | 9/2009 | Procyshyn et al. | |
| 2013/0001970 | A1 | 1/2013 | Suyama et al. | |

FOREIGN PATENT DOCUMENTS

| | | | |
|---|---|---|---|
| DE | 102018203626 | B3 | 8/2019 |
| EP | 2733196 | A1 | 5/2014 |
| JP | S5070979 | A | 6/1975 |
| JP | H06297370 | A | 10/1994 |

OTHER PUBLICATIONS

English translation of the examination report issued by the German Patent Office for application DE 10 2020 102 761.3 dated Dec. 17, 2020; 12 pages.

International Search Report and Written Opinion issued for PCT/EP2021/052444 on Aug. 24, 2021.

English Translation of the International Preliminary Report on Patentability issued for PCT/EP2021/052444 on Jul. 28, 2022.

* cited by examiner

END EFFECTOR, ROBOT, SYSTEM AND METHOD FOR HANDLING OBJECTS IN AN ISOLATOR

CROSS-REFERENCE TO RELATED APPLICATIONS

This is a Continuation application of International patent application PCT/EP2021/052444, filed Feb. 2, 2021, which claims the priority of German patent application DE 10 2020 102 761.3, filed Feb. 4, 2020. Both applications PCT/EP2021/052444 and DE 10 2020 102 761.3 are herewith incorporated by reference in their entirety.

BACKGROUND

The present application relates to an end effector, a robot, a system and a method for handling objects in an isolator.

Such end effectors, robots, systems and methods for handling objects in an isolator are generally known in the prior art.

For example, different end effectors can be used for handling different objects, which are suitable for handling the respective object type. Furthermore, end effectors that are suitable for handling different object types are also known. These end effectors have, for example, several tools or a multifunction tool for handling the different object types.

For example, the publication US 2009/0223592 A1 shows systems and methods that enable containers to be filled with a product. A filling arm is disposed within a chamber. An optical sensor is configured to detect openings of the containers within the chamber. The positions of the detected openings are used to guide the filling arm to fill the containers with a product.

Further, EP 2 733 196 A1 discloses a liquid processing system for processing liquid biological material. The fluid processing system comprises: a body provided rotatable about an axis, within a predetermined working space; a first arm provided on the body and having three degrees of freedom or higher; a second arm provided on the body and having three degrees of freedom or higher; drive device configured to drive each of the body, the first arm and the second arm; physiochemical equipment disposed within the working space and within the range of movement of at least one of the first arm and the second arm; wherein the driving means is driven by clay play based on the positions and shapes of the physiochemical equipment, and the biological material is processed using the physiochemical equipment.

However, the known end effectors, robots, systems and methods for handling objects in an isolator still leave room for improvement.

BRIEF SUMMARY

It is therefore an object of the present application to provide an improved end effector, robot, system, and method for handling objects in an isolator.

Furthermore, it is an object of the present application to handle various objects within an isolator in the simplest possible manner.

Furthermore, it is an object of the present application to provide an end effector for handling objects in an insulator which has as simple a structure as possible and is as simple as possible to control and manufacture.

In accordance with a first aspect of the present application, an end effector for handling objects in an isolator is provided. The end effector comprises a first receptacle for a first object, a second receptacle for a second object, and a first displacement member, wherein the receptacles are arranged in a longitudinal direction on opposite sides of the end effector, wherein each receptacle is displaceable between a receiving position in which the respective object can be received in the corresponding receptacle and a gripping position in which the respective object can be gripped with the corresponding receptacle, wherein each the receptacle has a first gripping portion, the first gripping portion of the first receptacle being disposed at a first end of the displacement member and the first gripping portion of the second receptacle being disposed at an opposite, second end of the displacement member, wherein the displacement member is displaceable such that the first receptacle and the second receptacle are each displaceable between the receptacle position and the gripping position.

According to a second aspect of the present application, a robot for handling objects in an isolator is provided, the robot comprising an end effector according to the first aspect of the invention.

According to a third aspect of the present application, there is provided a system comprising an isolator and a robot disposed in the isolator according to the second aspect of the invention.

According to a fourth aspect of the present application, a method of handling objects in an isolator is provided, wherein a robot having an end effector is disposed in the isolator, the end effector having a first receptacle for a first object, a second receptacle for a second object, and a first displacement member, wherein the receptacles are disposed on opposite sides of the end effector in a longitudinal direction, wherein each receptacle has a first gripping portion, wherein the first gripping portion of the first receptacle is disposed at a first end of the displacement member and the first gripping portion of the second receptacle is disposed at an opposite, second end of the displacement member, wherein the displacement member is displaceable, the method comprising the steps of:

arranging the first receptacle or the second receptacle in a receiving position in which the first object or the second object can be received in the corresponding receptacle;

receiving the respective object in the corresponding receptacle; and gripping the respective object by displacing the displacement member in such a way that the corresponding receptacle is displaced from the receiving position into a gripping position in which the respective object can be gripped.

The objects to be handled can be, for example, vials, cartridges, bottles, syringes, cylindrical ampoules, filling needles, a filling needle holder, Petri dishes, agar plates and/or the like. The first object is preferably a vial, a bottle, a syringe, a cylindrical ampoule, filling needles or a filling needle holder, in particular a tangible protrusion of a filling needle holder. The second object is preferably a Petri dish or an agar plate.

The term "isolator" is generally understood to mean a container which is hermetically and gas-tight sealed off from the surrounding working space. A defined atmosphere can be generated inside an isolator for processing sensitive or hazardous products. The isolator can preferably be an aseptic isolator, which preferably has a filling area for fluid filling of objects (e.g. vials, cartridges, vials, syringes and/or the like) by means of filling needles.

Each receptacle has a receiving position and a gripping position and can be moved between these positions. In the receiving position, each pick-up is open to the extent that the pick-up can pick up a corresponding object. In other words, the receptacle is thereby opened to such an extent that the corresponding object can be inserted into the receptacle. The receiving position can thus also be referred to as the open or open position. In the gripping position, the receptacle is closed to such an extent that the corresponding object is gripped by the receptacle. "Gripping" in this context means that the object is clamped or held in the receptacle. The gripping position can thus also be referred to as the closed position.

The first displacement member is displaceable. This means that the first displacement member is movable relative to other components of the end effector. In other words, the first displacement member is displaceably arranged on the end effector.

Furthermore, the first displacement member couples the displacement of the first and second receptacles. For this purpose, the first displacement member extends from the first receptacle to the second receptacle and forms the corresponding first gripping sections of the receptacles at its ends. When the first displacement member is displaced, the gripping portions at the ends of the first displacement member are also displaced so that the receptacles are either further opened or further closed. This also displaces the receptacles between the gripping position and the receiving position.

The end effector is thus designed as a multifunctional tool that has two receptacles with which different objects can be handled. By moving the displacement member, both holders can be moved simultaneously. This means that only one drive device is required for the displacement member in order to displace both holders.

The robot is designed to move and align the end effector in the isolator. For example, a first object to be handled may be arranged in the isolator. The first receptacle can be moved or arranged in the receptacle position. Then, the robot can move the end effector in the isolator to the position of the object. In particular, the end effector may be moved to receive the first object into the first receptacle. Once the first object is positioned in the receptacle, the first receptacle can be moved to the grasping position to grasp the object. The robot can then move the end effector in the isolator further, allowing the first object gripped in the first receptacle to be transferred in space. To release the first object, the first receptacle is moved back to the receiving position. Accordingly, the second object can also be received, gripped, transferred and released again in the second receptacle.

The end effector according to the application thus makes it possible to handle various objects within an insulator in the simplest possible manner. In addition, the end effector according to the application has a simple structure and is easy to control and manufacture.

In a first refinement, the displacement member is displaceable such that when the first receptacle is disposed in the receiving position, the second receptacle is disposed in the gripping position, and when the second receptacle is disposed in the receiving position, the first receptacle is disposed in the gripping position.

The first receptacle and the second receptacle are displaced alternately between the receptacle position and the gripping position. For this purpose, the displacement member is displaced in such a way that one receptacle is opened further during displacement, while the other receptacle is closed further.

In a further refinement, the displacement member is displaceable such that when the first receptacle is disposed in the receiving position, the second receptacle is disposed in the receiving position, and when the second receptacle is disposed in the gripping position, the first receptacle is disposed in the gripping position.

The first receptacle and the second receptacle are displaced together between the receptacle position and the gripping position. For this purpose, the displacement member is displaced in such a way that both receptacles are either opened further or closed further during displacement.

In a further refinement, each receptacle includes a second gripping portion, the first and second gripping portions being arranged opposite each other in a transverse direction.

The first and second gripping sections thus form two sides of the receptacle between which the corresponding object is gripped or clamped in the gripping position. In particular, the longitudinal direction can be arranged substantially perpendicular to the transverse direction.

In a further refinement, the distance between the first and second gripping sections in the receiving position is such that the corresponding object can be received between the gripping sections.

In other words, the corresponding object can be inserted into or removed from or guided out of the receptacle in the receptacle position.

In a further refinement, the distance between the first and second gripping sections in the gripping position is so small that the corresponding object can be gripped between the gripping sections.

In other words, the corresponding object is gripped in the gripping position by moving the gripping sections towards each other to such an extent that they rest against the object and clamp or hold it between them.

In a further refinement, the displacement member is translationally or rotationally displaceable.

"Translational" means that the displacement member can be translated relative to the other components of the end effector. In other words, "translational displacement" means that the displacement member is displaced in space without changing its orientation in space. "Rotational" means that the displacement member is rotated relative to the other components of the end effector. In other words, "rotational displacement" means that the displacement member is rotated in space about an axis so that its orientation changes with respect to the other components of the end effector.

In a further refinement, the displacement member is displaceable in the transverse direction.

If the displacement member is displaced in the transverse direction, the distance between the first and second gripping sections changes. This causes each receptacle to either open wider or close wider. In other words, by displacing the displacement member in the transverse direction, each receptacle can be displaced either to the receptacle position or to the gripping position.

In a further refinement, the displacement member is rotatably mounted about a first axis of rotation, wherein the first axis of rotation is arranged perpendicular to the longitudinal direction and the transverse direction. In particular, the first axis of rotation may be arranged between the first end and the second end.

When the displacement member is rotated about the first axis of rotation, the ends of the displacement member are displaced substantially in the transverse direction. This causes each receptacle to either open wider or close wider. In other words, rotating the displacement member about the first axis of rotation can displace each receptacle to either the receiving position or the gripping position.

In a further refinement, the end effector further comprises a bearing member for at least one of the receptacles, wherein the second gripping portion of the respective receptacle is arranged at one end of the bearing member.

The bearing member and the displacement member are thus on opposite sides in the transverse direction. In particular, a corresponding bearing member can be provided for each receptacle, forming the corresponding second gripping section.

In a further refinement, the displacement member and the bearing member each have a recess at the corresponding ends, the recesses forming the corresponding gripping sections.

In the gripping position, the respective object thus protrudes partially into the recess. A distance between the gripping sections at the opening of the receptacle is thus smaller than a diameter of the object. This prevents the object from coming out of the receptacle in the gripping position. In addition, the object abuts at least two points on each gripping section formed as a recess. The recesses thus enable self-centering of the object and a secure hold on the gripping sections.

In another refinement, the bearing member is rigidly or movably arranged on the end effector.

To arrange the bearing member rigidly on the end effector, the bearing member may be fixedly attached to the end effector. In order to arrange the bearing member movably on the end effector, the bearing member can be either displaceable in the transverse direction or rotatable about a second axis of rotation, the second axis of rotation being arranged parallel to the first axis of rotation.

In a further refinement, the bearing member is displaceable, in particular translationally or rotationally, wherein a movement of the bearing member is coupled with the movement of the displacement member, so that when displacing from the receiving position to the gripping position, the gripping portions are moved towards each other, and when displacing from the gripping position to the receiving position, the gripping portions are moved away from each other.

By coupling the movement of the bearing member and the displacement member, the gripping sections of a receptacle can be moved towards or away from each other. This allows the objects to be gripped particularly well and then released again.

In a further refinement, the end effector further comprises a drive device for displacing the displacement member.

In this way, the displacement member can be displaced automatically by means of the drive device. The drive unit can be controlled by a control unit, for example. The control device can, for example, transmit control signals to the drive device.

In a further refinement, the drive device is configured to displace the displacement member in the transverse direction or to rotate the displacement member about the first axis of rotation.

If the displacement member is translationally displaceable, the drive device can displace the displacement member in the transverse direction. If the displacement member is rotationally displaceable, the drive device can rotate the displacement member about the corresponding first axis of rotation. This displaces each receptacle between the receiving position and the gripping position.

In another refinement, the displacement member is rotatably supported on the end effector about the first axis of rotation by means of a first coupling member, the first coupling member having a toothed portion, the drive device having a drive shaft engaged with the toothed portion.

In this way, the drive device can rotationally displace the displacement member. The first coupling member is connected to the displacement member in a rotationally fixed manner, so that the first coupling member and the displacement member rotate together about the first axis of rotation. When the drive shaft is rotated about a longitudinal axis, the first coupling member and the displacement member are rotated about the first axis of rotation. The drive shaft has a longitudinal axis. For example, the longitudinal axis may be parallel or perpendicular to the first axis of rotation.

In particular, the first toothed portion may have teeth distributed in a circumferential direction about the first axis of rotation, wherein the drive shaft has a thread that engages with the teeth of the first toothed portion. In this regard, the longitudinal axis of the drive shaft is arranged perpendicular to the first axis of rotation. For example, the longitudinal axis of the drive shaft may be arranged parallel to the longitudinal direction.

In another refinement, the bearing member is rotatably mounted to the end effector about the second axis of rotation by means of a second coupling member, the second coupling member having in a second toothed portion, the drive shaft being engaged with the second toothed portion.

In this way, the drive device can rotationally displace the bearing member. The second coupling member is connected to the bearing member in a rotationally fixed manner, so that the second coupling member and the bearing member rotate together about the second axis of rotation. When the drive shaft is rotated about a longitudinal axis, the second coupling member and the bearing member are rotated about the second axis of rotation.

Since the first coupling member and the second coupling member are engaged with the drive shaft, when the drive shaft is rotated, both the first coupling member and the second coupling member are rotated about the first and second rotational axes, respectively. As a result, the rotational movements of the displacement member and the bearing member are coupled to each other. In particular, the drive shaft is arranged between the first and second coupling members. As a result, the first coupling member and the second coupling member are rotated in opposite directions of rotation, so that the gripping portions of a receptacle, the second gripping portion of which comprises the bearing member, are moved towards or away from each other.

In particular, the second toothed portion may have teeth distributed in a circumferential direction about the second axis of rotation, wherein the thread of the drive shaft is engaged with the teeth of the second toothed portion.

In a further refinement, the end effector comprises two first receptacles and two displacement members, the first gripping portion of a respective one of the first receptacles being disposed at the first end of each displacement member, the first and second gripping portions of the second receptacle being disposed at the second, opposite ends of the displacement members, respectively.

In this way, two first objects can be gripped simultaneously with the first holders. This is particularly advantageous when smaller first objects, for example several vials, containers, filling needles and the like, are to be handled simultaneously in the isolator. The second holder is preferably designed for handling larger objects, such as Petri dishes or agar plates, which are usually handled individually.

In a further refinement, the end effector comprises a respective bearing member for each first receptacle, wherein the second gripping portion of the respective receptacle is arranged at one end of the corresponding bearing member.

The bearing members can again be designed to be movable, with a movement of each bearing member being coupled to the movement of the corresponding displacement member, so that when each receptacle is displaced, the gripping sections are moved towards or away from each other.

In a further refinement, the end effector has a drive device for displacing each of the displacement members.

Each drive unit thus translates or rotates a corresponding displacement member. In this way, three holders can be displaced simultaneously between a holding position and a gripping position by means of two drive devices.

In a further refinement, the end effector comprises at least one spring member arranged to bias the first receptacle and/or the second receptacle into the gripping position.

In this way, at least one receptacle can be biased into the gripping position. The holder, which is biased into the gripping position, can then be displaced into the holding position against the preload acting through the spring member in order to hold an object in it. In the event of a power failure while an object is being gripped and handled in this receptacle, the receptacle remains in the gripping position due to the pretension of the spring member. This prevents the holder from opening in the event of a power failure and the object to be handled from falling out of the holder.

In a further refinement, the robot has a support structure, in particular an articulated support structure, for supporting the end effector.

The support structure can, for example, have several arms that are coupled to each other via joints. The support structure of the robot can be designed to be movable in such a way that the end effector in the isolator can be moved by means of the robot. The robot can also have drive devices for moving the carrier structure.

In another refinement, the end effector is rotatably mounted at one end of the support structure.

In this way, the end effectors receptacles in the isolator can be aligned with respect to the objects to be received. The robot can also have a further drive device for rotating the end effector.

In a further refinement, the system comprises a control device configured to control the movement of the end effector.

The control device can, for example, control at least one drive device of the end effector in order to displace the receptacles between the receiving position and the gripping position. For this purpose, the control device can, for example, send control signals to the drive devices of the end effector. Further, the control device may control the robot to move and align the end effector in the insulator. For this purpose, the control device can, for example, send control signals to the corresponding drive devices of the robot.

In a further refinement, the system comprises sensor means adapted to detect the position and orientation of the end effector and objects in the isolator, the sensor means sending sensor signals to the control device, the control device being adapted to control the robot and the end effector based on the sensor signal.

In a further refinement, the method further comprises the step of:

handling of the respective object by moving the end effector by means of the robot in the isolator while the respective object is gripped.

Handling means that the robot moves the end effector and thus also the respective gripped object in the isolator in order to position and align the respective gripped object in the isolator. For example, the robot can be controlled in such a way that it moves the end effector in such a way that the respective object is transferred to a target position.

In a further refinement, the method further comprises the step of:

releasing the respective object by displacing the displacement member in such a way that the corresponding receptacle is displaced into the receiving position.

As soon as the respective object has been gripped in the corresponding holder, the object can be transferred by means of the robot in the isolator. After the object has reached its target position, the respective object can be released again by moving the displacement member accordingly.

It is understood that the above-mentioned features, which will be explained below, can be used not only in the combination indicated in each case, but also in other combinations or on their own, without leaving the scope of the present invention.

BRIEF DESCRIPTION OF THE SEVERAL VIEWS OF THE DRAWING

Embodiments of the application are shown in the drawing and are explained in more detail in the following description. It shows.

DETAILED DESCRIPTION

Figure 1A:
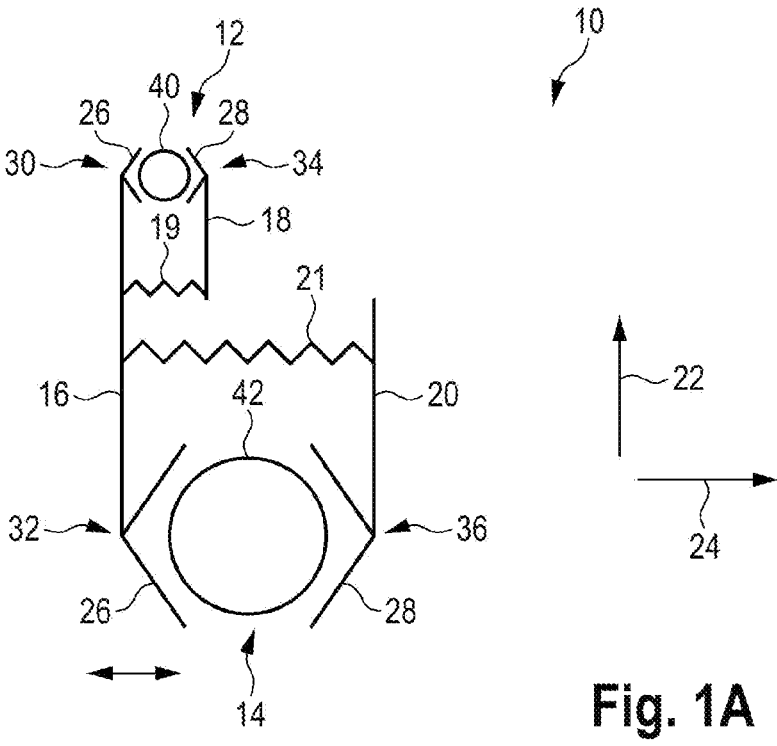
FIG. 1A is a schematic view of a first embodiment of an end effector.

FIG. 1A shows a first embodiment of an end effector 10 for handling objects 40, 42 in an isolator. The end effector 10 includes a first receptacle 12 for receiving and gripping a first object 40 and a second receptacle 14 for receiving and gripping a second object 42.

The first object 40 is smaller than the second object 42. The objects 40, 42 are cylindrical in shape. The first object 40 has a smaller diameter than the second object 42. The objects 40, 42 can be, for example, vials, bottles, syringes, cylindrical ampoules, filling needles, a filling needle holder, Petri dishes or agar plates. For example, the first object 40 may be a vial, bottle, syringe, cylindrical ampoule, filling needles or a filling needle holder, in particular a tangible protrusion of a filling needle holder. For example, the second object 42 may be a Petri dish or an agar plate.

The first receptacle 12 and the second receptacle 14 are disposed on opposite sides of the end effector 10 in a longitudinal direction 22. Each receptacle 12, 14 has an opening in the longitudinal direction 22 that are oriented opposite to each other. Each opening faces away from the end effector.

Each receptacle 12, 14 has a first gripping portion 26 and a second gripping portion 28. The first gripping section 26 and the second gripping section 28 are arranged opposite each other in a transverse direction 24. Between the first gripping section 26 and the second gripping section 28 of the first receptacle 12, the first object 40 can be arranged. The second object 42 may be disposed between the first gripping section 26 and the second gripping section 28 of the second receptacle 14.

The first receptacle 12 and the second receptacle 14 have different sizes. The first receptacle 12 is smaller than the second receptacle 14. The distance between the first and second gripping sections 26, 28 of the first receptacle 12 is smaller than the distance between the first and second gripping sections 26, 28 of the second receptacle 14. The first receptacle 12 is thus suitable for receiving and gripping the smaller first object 12, whereas the second receptacle is suitable for receiving and gripping the larger, second object 42.

The end effector 10 further comprises a displacement member 16. The displacement member 16 includes the first gripping portion 26 of the first receptacle 12 at a first end 30. In particular, the displacement member 16 may form the first gripping portion 26 of the first receptacle 12 at the first end 30. The displacement member 16 has the first gripping portion 26 of the second receptacle 14 at a second, opposite end 32. In particular, the displacement member 16 may form the first gripping portion 26 of the second receptacle 14 at the second end 32. The displacement member 16 thus extends from the first receptacle 12 to the second receptacle 14.

The end effector 10 further comprises a first bearing member 18. The first bearing member 18 is rigidly disposed or attached to the end effector 10. The first bearing member 18 extends to the first receptacle 12, and the second gripping portion 28 of the first receptacle 12 is disposed at an end 34 of the first bearing member 18.

The end effector 10 further comprises a second bearing member 20. The second bearing member 20 is rigidly disposed or attached to the end effector 10. The second bearing member 20 extends to the second receptacle 14. The second gripping portion 28 of the second receptacle 14 is arranged at one end 36 of the second bearing member 20.

Figure 5A:
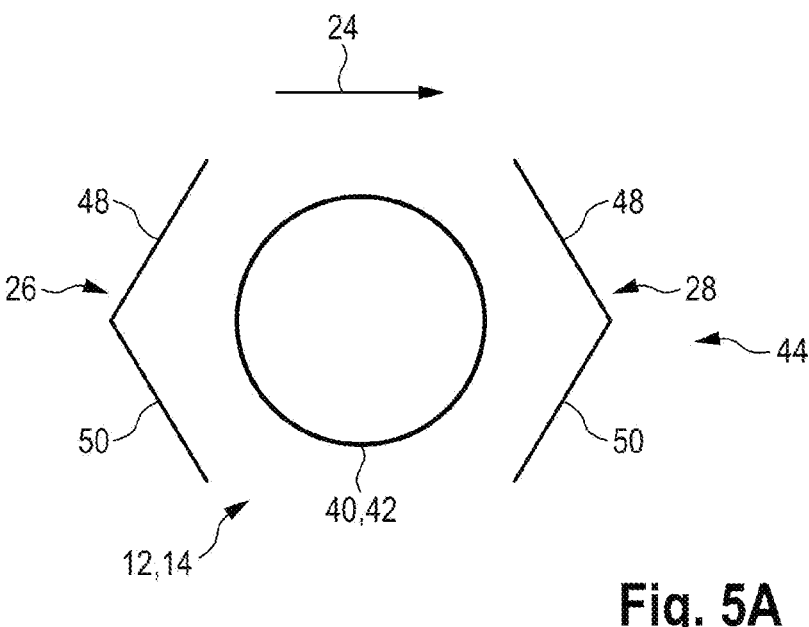
FIG. 5A is a schematic view of a receptacle for an object in a receiving position.

The displacement member 16 is displaceably arranged on the end effector. In particular, the displacement member 16 is displaceable such that the first receptacle 12 and the second receptacle 14 can each be displaced between a receptacle position 44 and a gripping position 46. The receiving position 44 is shown in FIG. 5A. The gripping position 46 is shown in FIG. 5B.

In the receiving position 44 shown in FIG. 5A, the gripping sections 26, 28 are arranged such that the corresponding object 40, 42 can be received or inserted between the gripping sections 26, 28. In particular, in the receiving position 44, the distance between the gripping sections 26, 28 is such that the corresponding object 40, 42 can be received or inserted between the gripping sections 26, 28. In other words, the distance between the gripping sections 26, 28 is greater than the diameter of the respective object 40, 42.

Figure 5B:
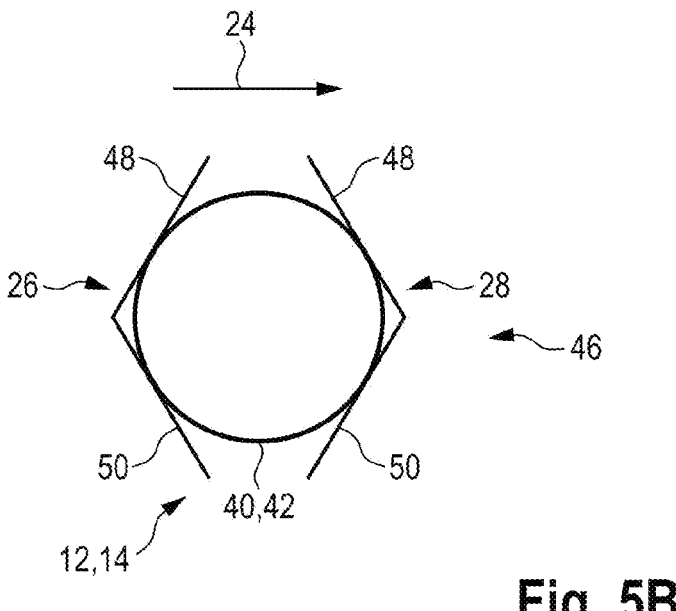
FIG. 5B is a schematic view of a receptacle for an object in a gripping position.
Figure 6:
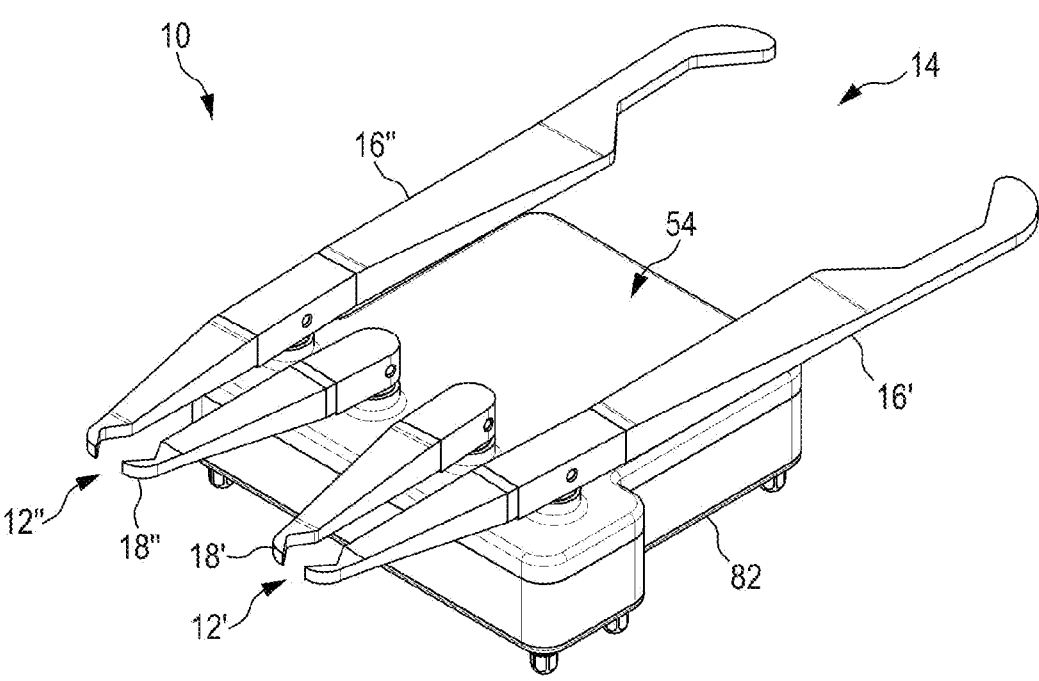
FIG. 6 is an isometric view of a top surface of an end effector according to a ninth embodiment.
Figure 7:
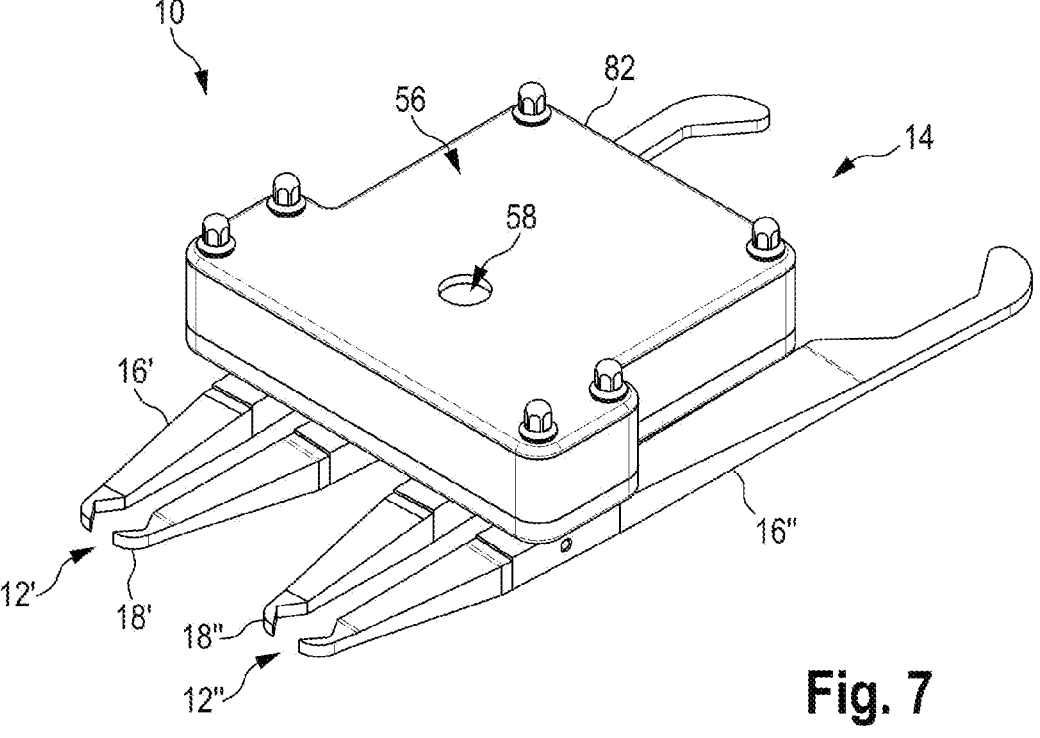
FIG. 7 is an isometric view of a bottom side of the end effector from FIG. 6.
Figure 8:
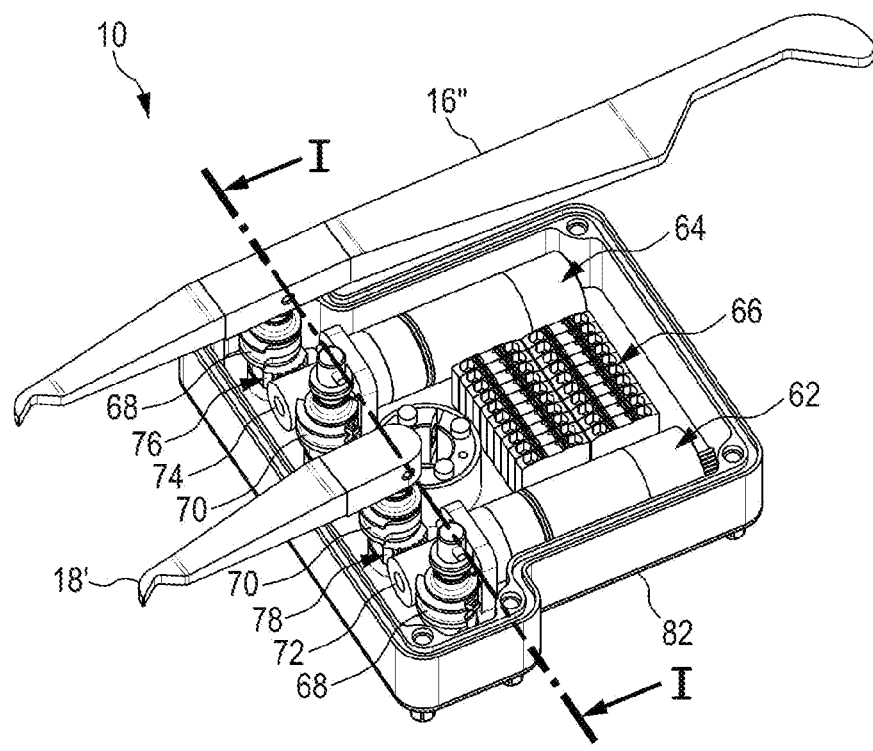
FIG. 8 is an isometric partial view of the end effector from FIG. 6 with the top open and with only one displacement member and bearing member each.
Figure 9:
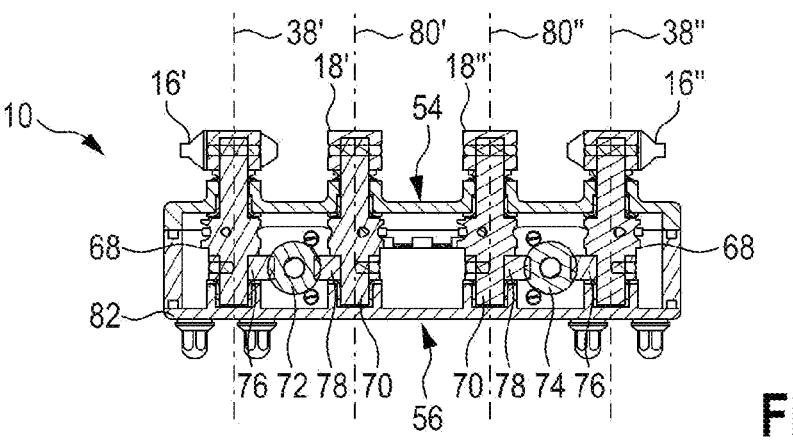
FIG. 9 is a cross-sectional view along line I-I from FIG. 8.
Figure 10:
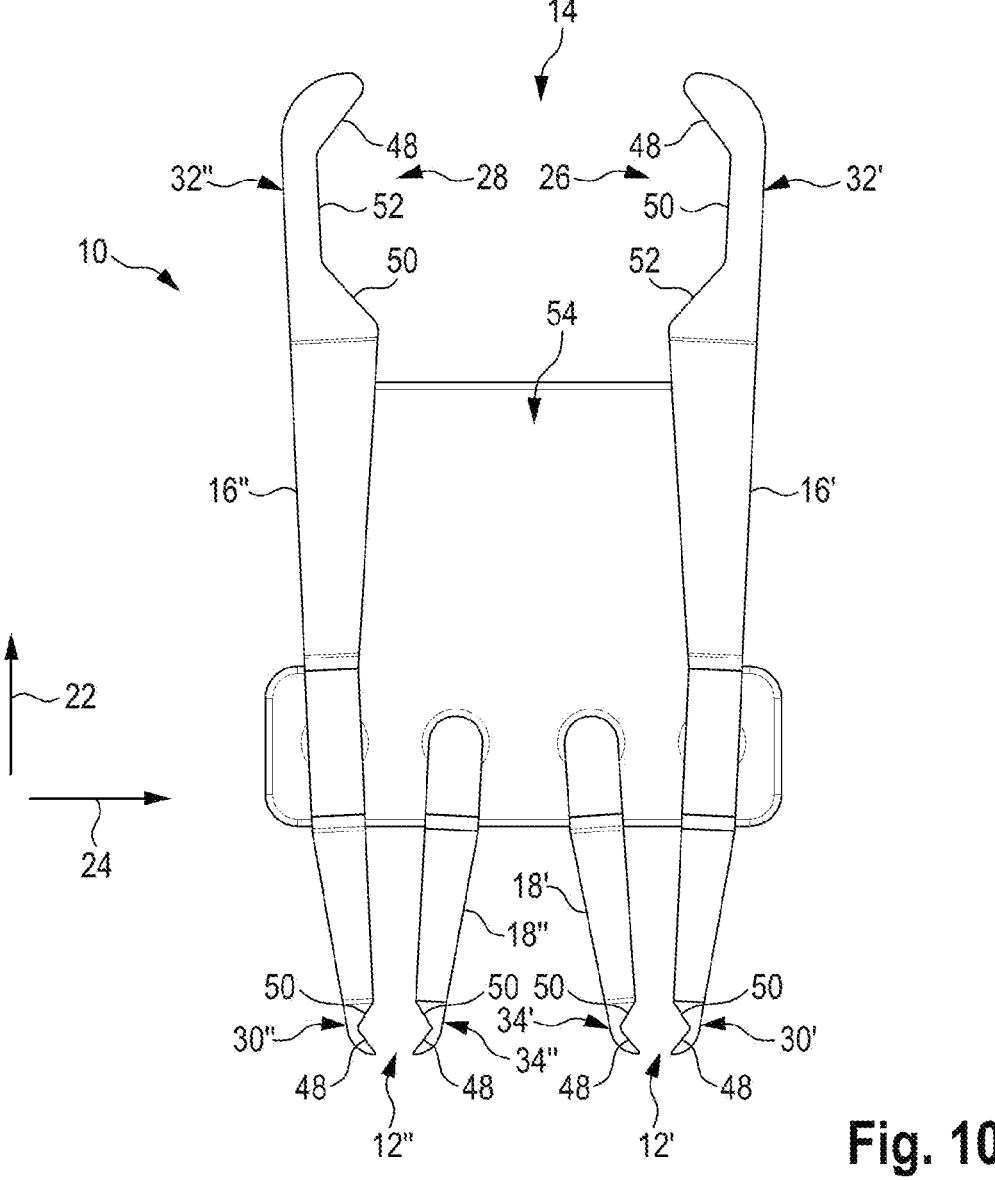
FIG. 10 is a top view of the end effector from FIG. 6.

In the gripping position 46 shown in FIG. 5B, the gripping sections 26, 28 are arranged in such a way that the corresponding object 40, 42 can be gripped. For this purpose, the distance between the gripping sections 26, 28 is smaller than in the receiving position 44. In particular, the distance between the gripping sections 26, 28 is so small that the gripping sections 26, 28 rest against the corresponding object 40, 42 on both sides and hold or clamp it between them.

The gripping portions 26, 28 may each be formed as a recess at the ends of the respective elements 16, 18, 20. Each recess has a first edge portion 48 and a second, opposite edge portion 50. In the gripping position 46, the corresponding object 40, 42 rests at least against the first edge portion 48 and the second edge portion 50. A depth of the gripping portions 26, 28 of the first receptacle 12 formed as a recess is smaller than half the diameter of the first object 40 in the transverse direction 24. A depth of the gripping portions 26, 28 of the second receptacle 14 formed as a recess is smaller than half the diameter of the second object 42 in the transverse direction 24. Alternatively, a depth of the recesses may be deeper than half the diameter of the corresponding object if the object abuts the edge portions such that it protrudes into the recess less than half the diameter of the corresponding object.

In FIG. 1A, the displacement member 16 is translationally displaceable in the transverse direction 24. For displacement, the end effector can have, for example, a drive device that is designed to displace the displacement member 16 in the transverse direction 24.

The bearing member 18 and the bearing member 20 are arranged on the same side of the displacement member 16 in the transverse direction 24. Accordingly, the first gripping portions 26, 28 of the first and second receptacles 12, 14 are also arranged on the same side of the displacement member 16 in the transverse direction 24. In other words, the first and second receptacles 12, 14 are arranged on the same side of the displacement member 16 in the transverse direction 24.

If the displacement member 16 is displaced in the transverse direction 24, each receptacle 12, 14 increases or decreases in size equally. As a result, the receptacles 12, 14 are displaced together between the receptacle position 44 and the gripping position 46. In other words, the displacement member 16 is displaceable such that when the first receptacle 12 is disposed in the receiving position 44, the second receptacle 14 is also disposed in the receiving position 44, and when the first receptacle 12 is disposed in the gripping position 46, the second receptacle 14 is also disposed in the gripping position 46.

The end effector 10 may further comprise a first spring member 19. The first spring member 19 is configured to bias the first receptacle 12 in the gripping position 46. For this purpose, the first spring member 19 is arranged between the displacement member 16 and the bearing member 18.

Additionally or alternatively, the end effector 10 may further comprise a second spring member 21. The second spring member 21 is configured to bias the second receptacle 14 in the gripping position 46. For this purpose, the second spring member 19 is arranged between the displacement member 16 and the bearing member 20.

By means of the first and/or the second spring member 19, 21, both receptacles 12, 14 can be biased together in the gripping position.

Figure 1B:
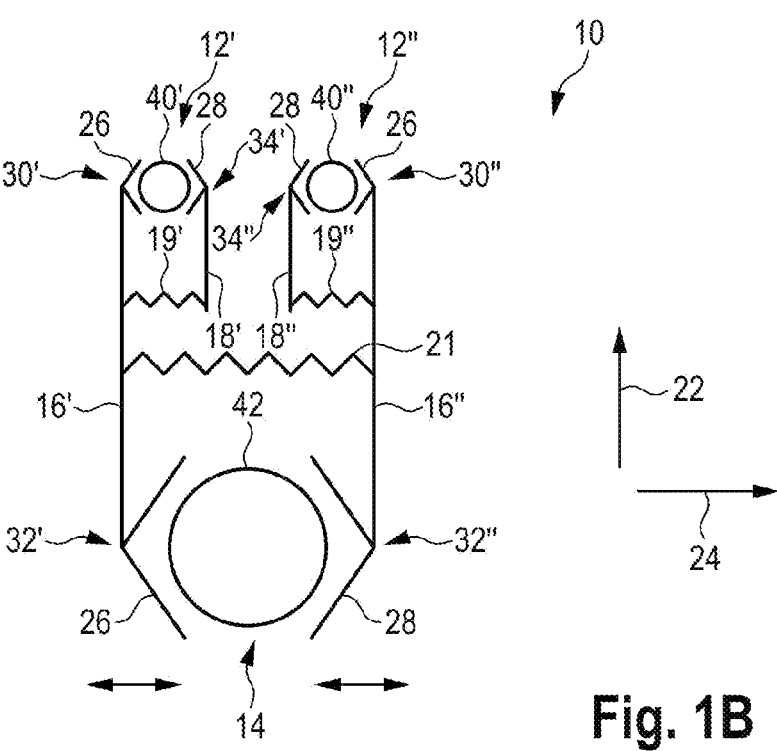
FIG. 1B is a schematic view of a second embodiment of an end effector.

FIG. 1B shows a second embodiment of an end effector 10 for handling objects 40', 40", 42 in an isolator. The end effector 10 of the second embodiment has a similar structure to the end effector 10 of the first embodiment. Like elements are marked with like reference numerals and will not be explained further. The end effector 10 of the second embodiment differs from the end effector 10 of the first embodiment in that the end effector 10 of the second embodiment comprises two first receptacles 12', 12", two displacement members 16', 16", two first bearing members 18', 18", but no second bearing member 20.

The first receptacles 12', 12" are each designed to receive and grip a first object 40', 40". The first objects 40', 40" are preferably the same. Each receptacle 12', 12", 14 also has a first and a second gripping section 26, 28. The bearing members 18', 18" are formed according to the bearing member 18. The displacement members 16', 16" are formed corresponding to the displacement member 16.

The displacement member 16' has the first gripping portion 26 of the receptacle 12' at a first end 30'. The displacement member 16' has the first gripping portion 26 of the receptacle 14 at a second, opposite end 32'. The displacement member 16" has the first gripping portion 26 of the receptacle 12" at a first end 30'. The displacement member 16" has, at a second, opposite end 32", the second gripping portion 28 of the receptacle 14.

The bearing member 18' has at one end 34' the second gripping section 28 of the receptacle 12'. The bearing member 18" has the second gripping section 28 of the receptacle 12" at one end 34".

The receptacles 12' and 12" are spaced apart in the transverse direction 24. The receptacles 12' and 12" are arranged at substantially the same height in the longitudinal direction 22. Accordingly, the displacement members 16', 16" are spaced from each other in the transverse direction 24. The bearing members 18' and 18" are also spaced apart in the transverse direction 24.

The bearing members 18' and 18" are arranged between the displacement members 16', 16". Accordingly, the receptacles 12' and 14 are arranged on the same side of the displacement member 16' in the transverse direction 24 and the receptacles 12" and 14 are arranged on the same side of the displacement member 16" in the transverse direction 24. The bearing members 18' and 18" can in principle be arranged rigidly or movably on the end effector 10. In the embodiment shown in FIG. 1B, the bearing members 18' and 18" are rigidly, i.e. fixedly, attached to the end effector.

The displacement members 16', 16" can be displaced in translation in the transverse direction 24. For this purpose, the end effector can each have a drive device which is designed to displace the corresponding displacement member 16', 16" in the transverse direction 24. Alternatively, only one drive device can be provided, which can displace both displacement members 16', 16" in the transverse direction 24. Preferably, the drive device are controlled such that the displacement members 16', 16" are displaced in opposite directions. In other words, the displacement members 16',

16" are moved either towards or away from each other in the transverse direction 24 by means of the drive device.

If the displacement members 16' and 16" are displaced towards each other in the transverse direction 24, each receptacle 12', 12", 14 is displaced into the gripping position 46. If the displacement members 16' and 16" are displaced away from each other in the transverse direction 24, each receptacle 12', 12", 14 is displaced to the receiving position 44. In other words, the displacement members 16' and 16" are displaceable such that when the first receptacles 12', 12" is disposed in the receiving position 44, the second receptacle 14 is also disposed in the receiving position 44 and when the first receptacles 12', 12" is disposed in the gripping position 46, the second receptacle 14 is also disposed in the gripping position 46.

The end effector 10 can further comprise two first spring members 19', 19". The first spring members 19', 19" are each configured to bias a respective one of the first receptacles 12', 12" in the gripping position 46. For this purpose, the first spring members 19', 19" are each arranged between the corresponding displacement member 16', 16" and the corresponding first bearing member 18', 18".

Additionally or alternatively, the end effector 10 may further comprise a second spring member 21. The second spring member 21 is configured to bias the second receptacle 14 in the gripping position 46. For this purpose, the second spring member 19 is arranged between the first displacement member 16' and the second displacement member 16".

By means of the first spring members 19', 19" and/or the second spring member 21, all receptacles 12', 12", 14 can be biased together into the gripping position 46.

Figure 2A:
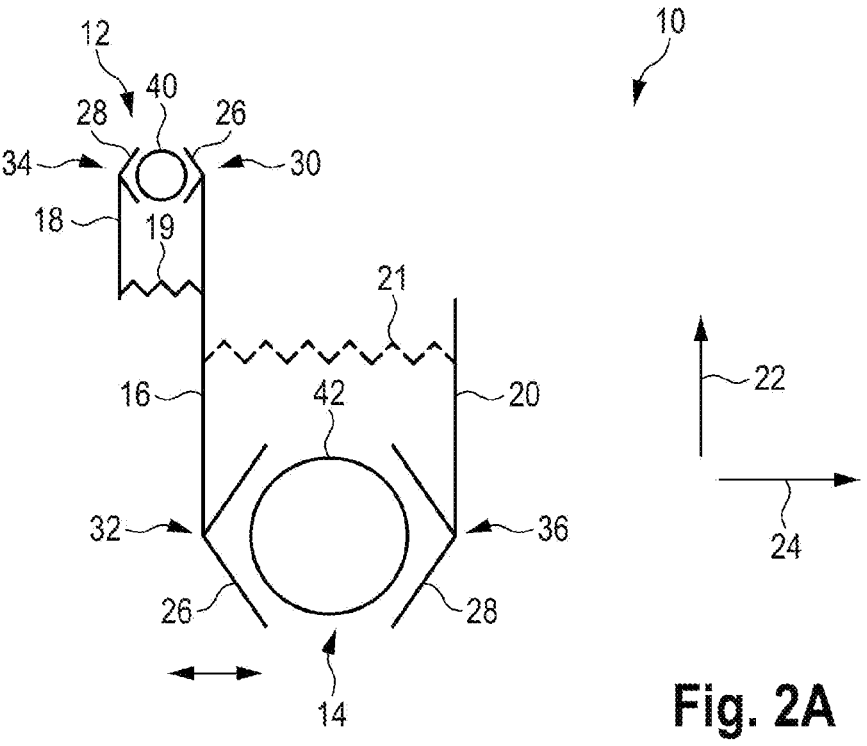
FIG. 2A is a schematic view of a third embodiment of an end effector.

FIG. 2A shows a third embodiment of an end effector 10 for handling objects 40, 42 in an isolator. The end effector 10 of the third embodiment is substantially the same as the end effector 10 of the first embodiment. Like elements are indicated by like reference numerals and will not be further explained. The end effector 10 of the third embodiment differs from the end effector 10 of the first embodiment in that the first bearing member 18 and the bearing member 20 are arranged on opposite sides of the displacement member 16 in the transverse direction 24. Accordingly, the first gripping portions 26, 28 of the first and second receptacles 12, 14 are also arranged on opposite sides of the displacement member 16 in the transverse direction 24. In other words, the first and second receptacles 12, 14 are arranged on opposite sides of the displacement member 16 in the transverse direction 24.

In FIG. 2A, the displacement member 16 of the end effector 10 of the third embodiment is also translationally displaceable in the transverse direction 22. When the displacement member 16 is displaced in the transverse direction 24, each receptacle 12, 14 alternately increases or decreases in size. As a result, the receptacles 12, 14 are alternately displaced between the receiving position 44 and the gripping position 46. In other words, the displacement member 16 is displaceable such that when the first receptacle 12 is disposed in the receiving position 44, the second receptacle 14 is disposed in the gripping position 46, and when the first receptacle 12 is disposed in the gripping position 46, the second receptacle 14 is also disposed in the receiving position 44.

The end effector 10 of the third embodiment includes either the first spring member 19 for biasing the first receptacle 12 into the gripping position 46, or the second spring member 21 for biasing the second receptacle 14 into the gripping position 46.

Figure 2B:
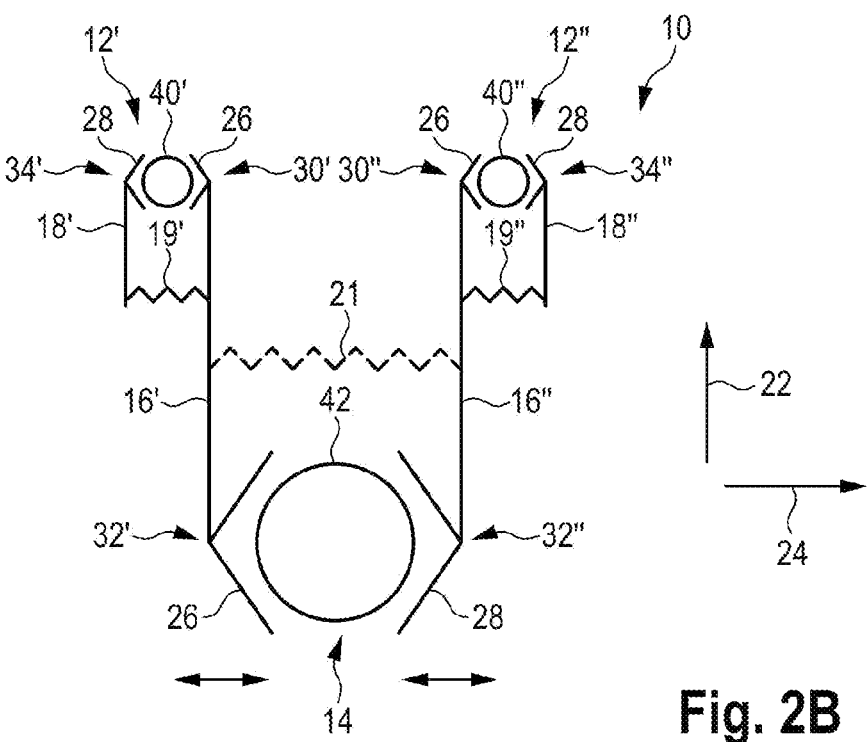
FIG. 2B is a schematic view of a fourth embodiment of an end effector.

FIG. 2B shows a fourth embodiment of an end effector 10 for handling objects 40', 40", 42 in an isolator. The end effector 10 of the fourth embodiment is substantially the same as the end effector 10 of the second embodiment. Like elements are indicated by like reference numerals and will not be explained in further detail. The end effector 10 of the fourth embodiment differs from the end effector 10 of the second embodiment in that the second receptacle 14 is arranged between the displacement members 16', 16", while each first receptacle 12', 12" is arranged on the side of the corresponding displacement member 16', 16" facing away from the second receptacle 14.

If the displacement members 16' and 16" are displaced towards each other in the transverse direction 24, the receptacles 12', 12" are displaced into the receiving position 44, while the receptacle 14 is displaced into the gripping position 46. If the displacement members 16' and 16" are displaced away from each other in the transverse direction 24, the receptacles 12', 12" are displaced to the gripping position 46 while the second receptacle 14 is displaced to the receiving position 44. In other words, the displacement members 16' and 16" are displaceable such that when the first receptacles 12', 12" are disposed in the receiving position 44, the second receptacle 14 is disposed in the gripping position and when the first receptacles 12', 12" are disposed in the gripping position 46, the second receptacle 14 is disposed in the receiving position 44.

The end effector 10 of the fourth embodiment has either the first spring members 19', 19" for biasing the first receptacles 12', 12" to the gripping position 46 or the second spring member 21 for biasing the second receptacle 14 to the gripping position 46.

Figure 3A:
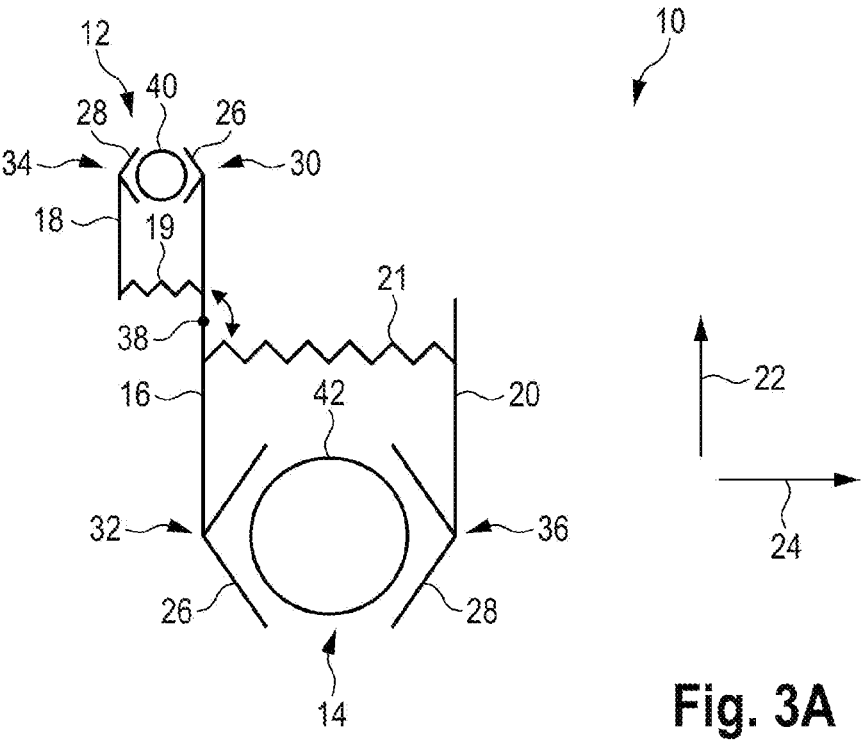
FIG. 3A is a schematic view of a fifth embodiment of an end effector.

FIG. 3A shows a fifth embodiment of an end effector 10 for handling objects 40, 42 in an insulator. The end effector 10 of the fifth embodiment is substantially the same as the end effector 10 of the third embodiment. Like elements are indicated by like reference numerals and will not be further explained. The end effector 10 of the fifth embodiment differs from the end effector of the third embodiment in that the displacement member 16 of the end effector 10 of the fifth embodiment is rotationally displaceable about an axis of rotation 38. The rotational axis 38 is arranged perpendicular to the longitudinal direction 22 and perpendicular to the transverse direction 24. The axis of rotation 38 is disposed between the first end 30 and the second end 32 of the displacement member 16.

If the displacement member 16 is rotated about the axis of rotation 38, each receptacle 12, 14 increases or decreases in size simultaneously. As a result, the receptacles 12, 14 are displaced together between the receptacle position 44 and the gripping position 46. In other words, the displacement member 16 is displaceable such that when the first receptacle 12 is disposed in the receiving position 44, the second receptacle 14 is also disposed in the receiving position 44, and when the first receptacle 12 is disposed in the gripping position 46, the second receptacle 14 is also disposed in the gripping position 46.

The end effector of the fifth embodiment may comprise the first spring member 19 and/or the second spring member 21. By means of the first and/or the second spring member 19, 21, both receptacles 12, 14 can be biased together in the gripping position.

Figure 3B:
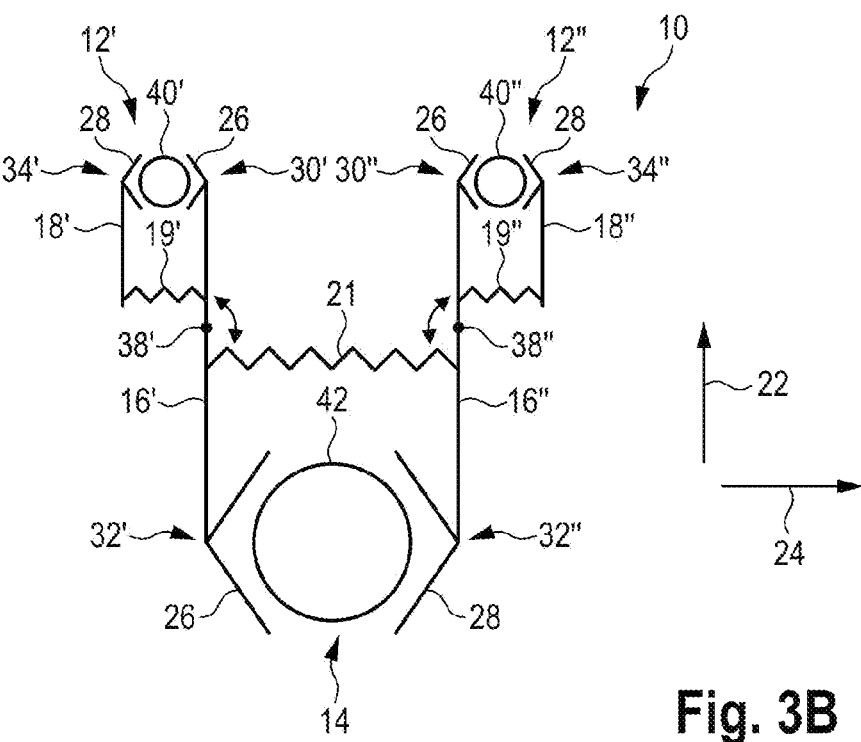
FIG. 3B is a schematic view of a sixth embodiment of an end effector.

FIG. 3B shows a sixth embodiment of an end effector 10 for handling objects 40', 40", 42 in an isolator. The end effector 10 of the sixth embodiment is substantially the same as the end effector 10 of the fourth embodiment. Like elements are indicated by like reference numerals and will not be further explained. The end effector 10 of the sixth embodiment differs from the end effector 10 of the fourth embodiment in that the displacement members 16', 16" of the end effector 10 of the sixth embodiment are rotationally displaceable about a respective first axis of rotation 38', 38". The first rotational axes 38', 38" are arranged parallel to each other and are respectively arranged perpendicular to the longitudinal direction 22 and perpendicular to the transverse direction 24. Each rotation axis 38', 38" is arranged between the first end 30', 30" and the second end 32', 32" of the respective displacement member 16', 16". The respective drive devices are designed to rotate the corresponding displacement member 16', 16" in opposite directions of rotation about the axes of rotation 38', 38". In the process, the first ends 30', 30" or the second ends 32', 32" are pivoted either towards or away from each other.

If the displacement members 16' and 16" are rotated about axes of rotation 38', 38" such that the second ends 32', 32" are pivoted toward each other, the receptacles 12', 12" are displaced to the gripping position 46, while the receptacle 14 is also displaced to the gripping position 46. When the displacement members 16' and 16" are rotated about axes of rotation 38', 38" such that the second ends 32', 32" are pivoted away from each other, the receptacles 12', 12" are displaced to the gripping position 44 while the second receptacle 14 is also displaced to the gripping position 44. In other words, the displacement members 16' and 16" are displaceable such that when the first receptacles 12', 12" is disposed in the receiving position 44, the second receptacle 14 is disposed in the receiving position 44 and when the first receptacles 12', 12" is disposed in the gripping position 46, the second receptacle 14 is also disposed in the gripping position 46.

The end effector of the sixth embodiment can have the first spring members 19', 19" and/or the second spring member 21. By means of the first spring members 19', 19" and/or the second spring member 21, all receptacles 12', 12", 14 can be biased together in the gripping position 46.

Figure 4A:
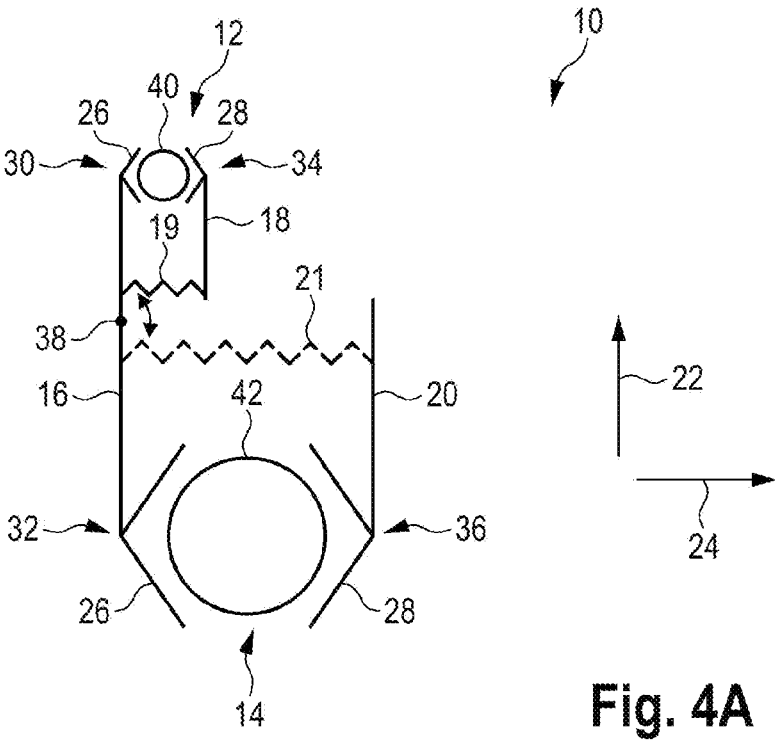
FIG. 4A is a schematic view of a seventh embodiment of an end effector.

FIG. 4A shows a seventh embodiment of an end effector 10 for handling objects 40, 42 in an insulator. The end effector 10 of the seventh embodiment is substantially the same as the end effector 10 of the first embodiment. Like elements are indicated by like reference numerals and will not be further explained. The end effector 10 of the seventh embodiment differs from the end effector of the first embodiment in that the displacement member 16 is rotationally displaceable about the axis of rotation 38. The axis of rotation 38 is arranged perpendicular to the longitudinal direction 22 and perpendicular to the transverse direction 24. The axis of rotation 38 is disposed between the first end 30 and the second end 32 of the displacement member 16.

If the displacement member 16 is rotated about the axis of rotation 38, each receptacle 12, 14 alternately increases or decreases in size. As a result, the receptacles 12, 14 are alternately displaced between the receptacle position 44 and the gripping position 46. In other words, the displacement member 16 is displaceable such that when the first receptacle 12 is disposed in the receiving position 44, the second receptacle 14 is disposed in the gripping position 46 and, when the first receptacle 12 is disposed in the gripping position 46, the second receptacle 14 is also disposed in the receiving position 44.

The end effector 10 of the third embodiment includes either the first spring member 19 for biasing the first receptacle 12 into the gripping position 46, or the second spring member 21 for biasing the second receptacle 14 into the gripping position 46.

Figure 4B:
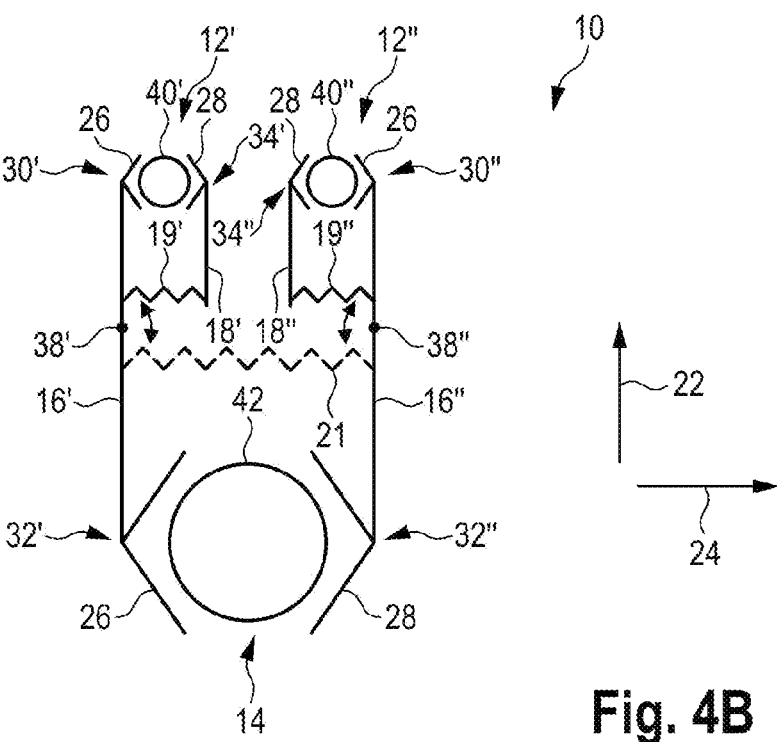
FIG. 4B is a schematic view of an eighth embodiment of an end effector.

FIG. 4B shows an eighth embodiment of an end effector 10 for handling objects 40', 40", 42 in an isolator. The end effector 10 of the eighth embodiment is substantially the same as the end effector 10 of the second embodiment. Like elements are indicated by like reference numerals and will not be explained in further detail. The end effector 10 of the eighth embodiment differs from the end effector 10 of the second embodiment in that the displacement members 16', 16" of the end effector 10 of the eighth embodiment are rotationally displaceable about a respective axis of rotation 38', 38". The rotational axes 38', 38" are arranged parallel to each other and are respectively arranged perpendicular to the longitudinal direction 22 and perpendicular to the transverse direction 24. Each rotation axis 38', 38" is arranged between the first end 30', 30" and the second end 32', 32" of the respective displacement member 16', 16". The respective drive devices are designed to rotate the corresponding displacement member 16', 16" in opposite directions of rotation about the axes of rotation 38', 38". In the process, the first ends 30', 30" or the second ends 32', 32" are pivoted either towards or away from each other.

If the displacement members 16' and 16" are rotated about axes of rotation 38', 38" such that the second ends 32', 32" are pivoted toward each other, the receptacles 12', 12" are displaced to the receiving position 44 while the receptacle 14 is displaced to the gripping position 46. When the displacement members 16' and 16" are rotated about axes of rotation 38', 38" such that the second ends 32', 32" are pivoted away from each other, the receptacles 12', 12" are displaced to the gripping position 46 while the second receptacle 14 is displaced to the receiving position 44. In other words, the displacement members 16' and 16" are displaceable such that when the first receptacles 12', 12" is disposed in the receiving position 44, the second receptacle 14 is disposed in the gripping position and when the first receptacles 12', 12" is disposed in the gripping position 46, the second receptacle 14 is also disposed in the receiving position 44.

The end effector 10 of the fourth embodiment has either the first spring members 19', 19" for biasing the first receptacles 12', 12" to the gripping position 46 or the second spring member 21 for biasing the second receptacle 14 to the gripping position 46.

FIGS. 6 to 10 show a ninth embodiment of an end effector 10 for handling objects 40', 40", 42 in an isolator. The end effector 10 of the ninth embodiment is substantially the same as the end effector 10 of the eighth embodiment. Like elements are indicated by like reference numerals and will not be explained in further detail. The end effector 10 of the ninth embodiment differs from the end effector 10 of the eighth embodiment in that the bearing members 18' and 18" are rotatably mounted on the end effector 10 about a respective second axis of rotation 80', 80", the second axes of rotation 80', 80" being arranged parallel to the first axes of rotation 38', 38". Furthermore, the ninth embodiment shows in detail how the displacement members 16', 16" and the bearing members 18', 18" can be moved in a coupled manner.

The end effector 10 of the ninth embodiment further comprises a first drive device 62 configured to move the displacement member 16' and the bearing member 18'. The end effector 10 further comprises a second drive device 64 configured to move the displacement member 16" and the bearing member 18". In other words, the end effector 10 comprises a respective drive device 62, 64 for displacing a respective one of the displacement member 16', 16" and a respective one of the bearing member 18', 18".

Each drive device 62, 64 is designed to rotate the corresponding displacement member 16', 16" about the respective first axis of rotation 38', 38" and to rotate the corresponding bearing member 18', 18" about the respective second axis of rotation 80', 80". The first drive device 62 has a first drive shaft 72 by means of which the displacement member 16' and the bearing member 18' are driven. The second drive device 64 has a second drive shaft 74, by means of which the displacement member 16" and the bearing member 18" are driven. The longitudinal axes of the drive shafts 72, 74 are arranged parallel to each other and arranged perpendicular to the first and second axes of rotation 38', 38", 80', 80". For example, the longitudinal axes of the drive shafts 72, 74 may be arranged parallel to the longitudinal direction 22.

The end effector 10 may further comprise a power supply device 66. The power supply device 66 may be arranged to supply the electronic components of the end effector 10 with electrical energy (operating voltage) and/or to provide the electronic components of the end effector 10 with control signals from a control device. For this purpose, the power supply device 66 may comprise a plurality of terminals for signal lines and/or power lines.

The end effector 10 may further comprise a storage device for storing electrical energy. The storage device may be, for example, a battery or an accumulator. The drive devices 62, 64 may be electrically coupled to the storage device. For example, the drive devices 62, 64 may be electrically coupled to the storage device via the power supply device 66. Alternatively, the power supply device 66 may also comprise the storage device.

The end effector 10 has a corresponding first coupling member 68 for each displacement member 16', 16". Each first coupling member 68 is non-rotatably connected to the corresponding displacement member 16', 16". Each first coupling member 68 is rotatably mounted about the corresponding first axis of rotation 38', 38". Thus, each displacement member 16', 16" is rotatably mounted to the end effector 10 about the respective first axis of rotation 38', 38" by means of the corresponding first coupling member 68. Each first coupling member 68 is coupled to the corresponding drive shaft 72, 74. To this end, each first coupling member 68 includes a first toothed portion 76 that engages the corresponding drive shaft 72, 74. For example, each drive shaft 72, 74 may have a thread and each first toothed portion 76 may have teeth distributed in a circumferential direction about the respective first axis of rotation 38', 38", wherein the thread of each drive shaft 72, 74 engages the teeth of the corresponding first toothed portion 76. When the drive shafts 72, 74 are rotated about the respective longitudinal axes, the corresponding coupling members 68 and thereby the corresponding displacement members 16', 16" are rotated about the respective first axis of rotation 38', 38".

Furthermore, the end effector 10 has a corresponding second coupling member 70 for each bearing member 18', 18". Each second coupling member 70 is non-rotatably connected to the corresponding bearing member 18', 18". Each second coupling member 70 is rotatably mounted about the corresponding second axis of rotation 80', 80". Thus, each bearing member 18', 18" is rotatably mounted to the end effector 10 about the respective second axis of rotation 80', 80" by means of the corresponding second coupling member 70. Each second coupling member 70 is coupled to the corresponding drive shaft 72, 74. To this end, each second coupling member 70 has a second toothed portion 78 that is engaged with the corresponding drive shaft 72, 74. For example, each second toothed portion 78 may have teeth distributed in a circumferential direction about the respective second axis of rotation 80', 80", wherein the threads of each drive shaft 72, 74 are engaged with the teeth of the corresponding second toothed portion 78. When the drive shafts 72, 74 are rotated about the respective longitudinal axes, the corresponding second coupling members 70 and thereby also the corresponding bearing members 18', 18" are rotated about the respective second axis of rotation 80', 80".

Since a first coupling member 68 and a second coupling member 70 of each of a drive shaft 72, 74 are engaged, when one of the drive shafts 72, 74 is rotated, both the first coupling member 68 and the second coupling member 70 are rotated about the corresponding first axis of rotation and second axis of rotation 38', 38", 80', 80", respectively. As a result, the rotational movements of each displacement member 16', 16" and the corresponding bearing member 18', 18" are coupled to each other. In particular, the respective drive shaft 72, 74 is arranged between the corresponding first and second coupling members 68, 70. As a result, the first coupling member 68 and the second coupling member 70 are rotated in opposite directions of rotation so that the gripping portions 26, 28 of the respective first receptacle 12', 12" are moved towards or away from each other.

The end effector 10 has a housing 82. The housing 82 has a top side 54 and a bottom side 56. The drive devices 62, 64 and the power supply device 66 are arranged in the housing 82. The displacement members 16', 16" and the bearing members 18', 18" are arranged outside the housing 82 at the upper side 54. The coupling members 68, 70 extend from the respective displacement members 16', 16" and bearing members 18', 18" into the housing. For this purpose, the housing has four corresponding holes on the upper side through which the coupling members 68, 70 are inserted into the housing.

The housing also has a bore 58 on the underside 56. A bearing 60 is disposed inside the housing and is aligned with the bore. A bearing member of a robot can be passed through the bore 58 from the outside and coupled to the bearing 60 to rotatably support the end effector 10 on the robot. A rotational axis of this bearing is preferably parallel to first and second rotational axes 38', 38", 80', 80".

Signal lines and/or control lines may be inserted into the housing through the hole 58. The signal lines and/or control lines may be coupled to the power supply device 66, for example. Alternatively, the signal lines and/or control lines may be connected directly to the electronic components of the end effector, for example, the drive devices 62, 64, to control and supply electrical power to the electronic components.

The gripping sections 26, 28 of the first receptacles 12', 12" are formed as V-shaped recesses and each have a first edge section 48 and a second edge section 50, which adjoin one another and are arranged at an angle to one another. The first and second edge sections 48, 50 adjoin one another, in particular at the deepest point of the recess.

The gripping portions 26, 28 of the second receptacle 14 are formed as a recess and each have a first edge portion 48, a second edge portion 50 and an intermediate portion 52 arranged between the first and second edge portions 48, 50. The first and second edge sections 48, 50 are arranged at an angle to one another. In particular, the intermediate section 52 forms the deepest section of the recess, the depth of the recess remaining the same along the intermediate section 52.

Figures 11, 12:
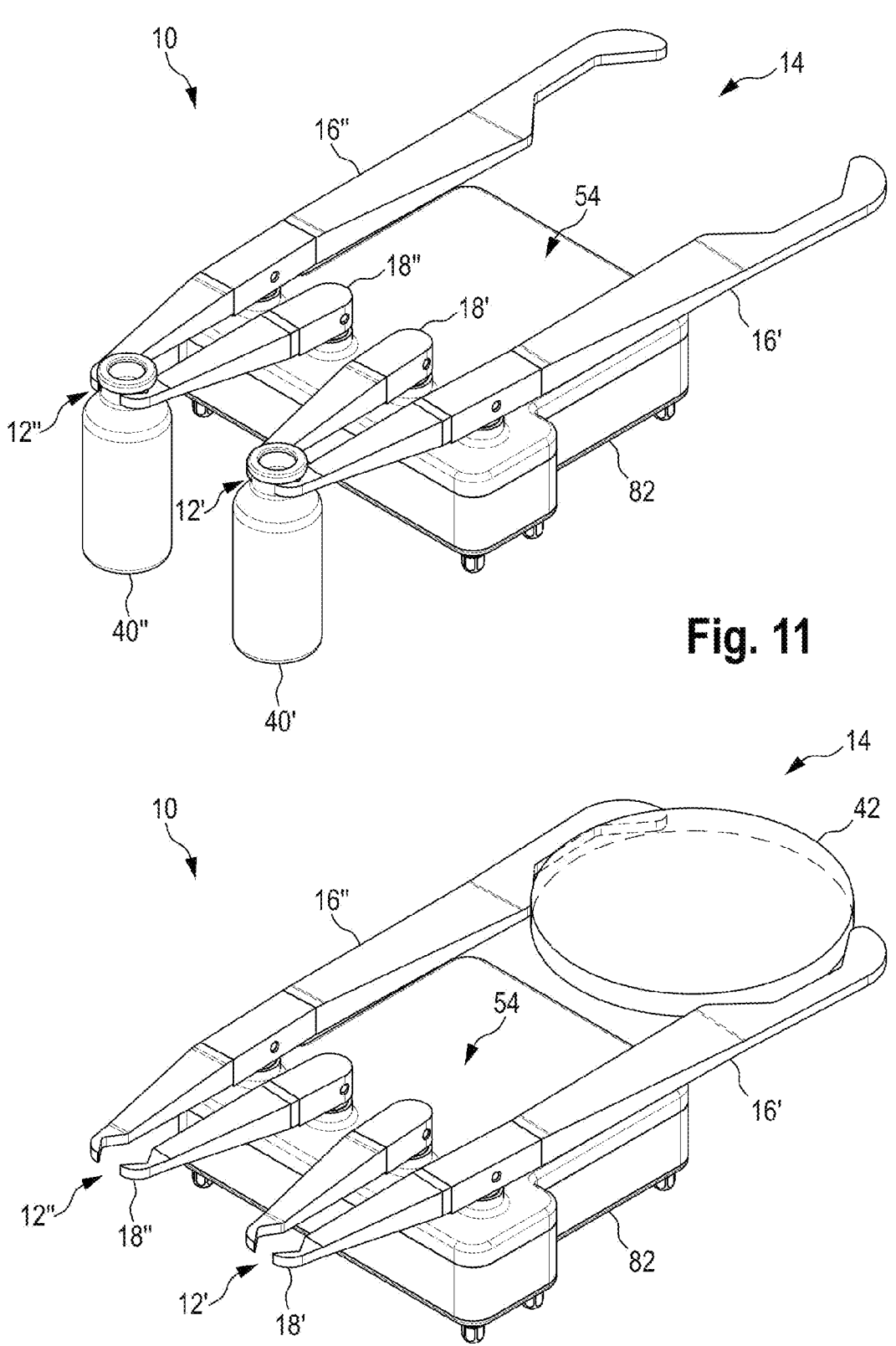
FIG. 11 is the view from FIG. 6 with two first objects.
FIG. 12 is the view from FIG. 6 with a second object.

FIG. 11 shows an example of the arrangement of two first objects 40', 40" in the first receptacles 12', 12". In this case, the first objects 40', 40" are two identically shaped bottles.

Accordingly, vials, cartridges, syringes and/or cylindrical ampoules can also be arranged in the first receptacles 12', 12".

FIG. 12 shows an example of the arrangement of a second object 42 in the second receptacle 14. In this case, the second object 42 is an agar plate or Petri dish.

Figure 13:
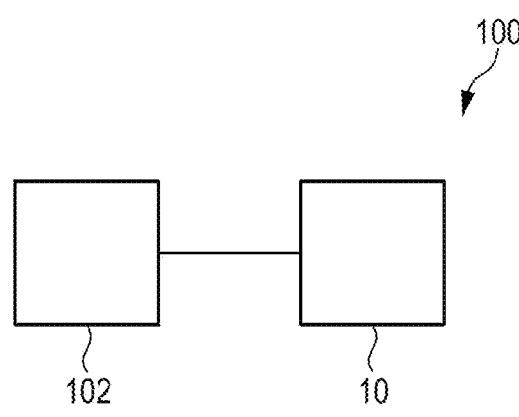
FIG. 13 is a schematic view of an embodiment of a robot.

FIG. 13 shows an embodiment of a robot 100 for handling objects in an isolator. The robot includes an end effector 10 a support structure 102 for supporting the end effector 10. The end effector 10 may be configured according to any of the embodiments described in FIGS. 1 to 12. The robot 100 is configured to move and align the end effector 10 within the isolator.

The support structure 102 may be articulated. For example, the support structure 102 may have a plurality of arms coupled together by joints. The support structure 102 of the robot 100 may be designed to be movable such that the end effector 10 in the insulator can be moved by means of the robot 100. For example, to move the support structure 102, the robot 100 may include one or more drive devices.

The end effector can be rotatably mounted at one end of the support structure. In this way, the receptacles 12, 14 of the end effector 10 in the isolator can be aligned with respect to the objects 40, 42 to be received. For rotating the end effector 10, the robot 100 may also include another drive device.

Figure 14:
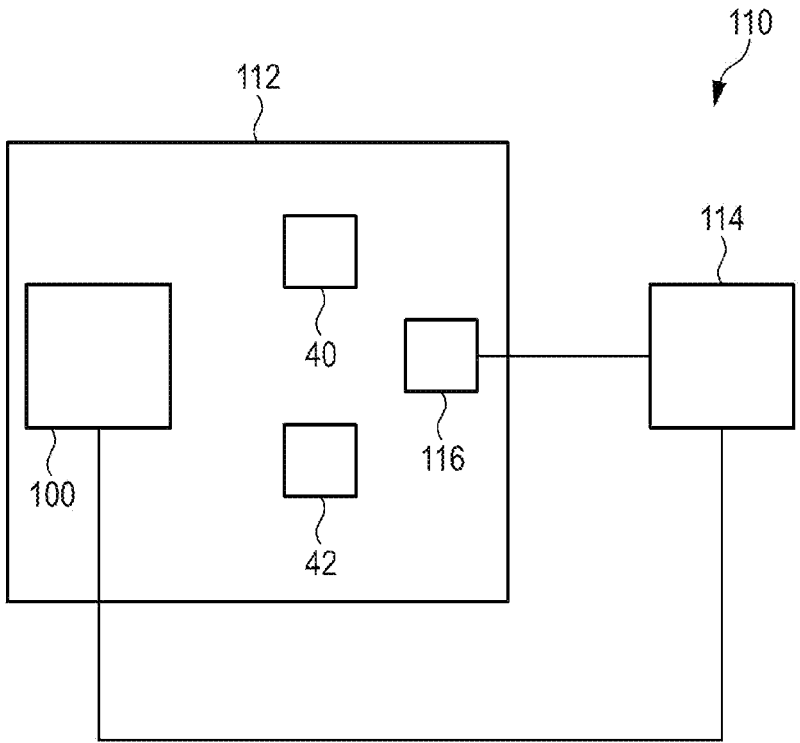
FIG. 14 is a schematic view of one embodiment of a system.

FIG. 14 shows an embodiment of a system 110 for handling objects 40, 42 in an isolator 112. The system comprises the isolator 112 and a robot 100. The robot 100 may be configured according to the embodiment described in FIG. 13. A first object 40 and/or a second object 42 may be disposed in the isolator 112.

The system further comprises a control device 114. The control device 114 is adapted to control the movement of the end effector 10 and/or the robot 100.

For example, the control device 114 may control at least one drive device of the end effector 10 to move the receptacles 12, 14 between the receptacle position 44 and the gripping position 46. For this purpose, the control device 114 may, for example, send control signals to the drive devices 62, 64 of the end effector.

Further, the control device 114 may control the robot 100 to move and align the end effector 10 within the insulator 112. To do so, the control device 114 may, for example, send control signals to the corresponding drive devices of the robot 100.

The system may further comprise a sensor device 116. The sensor device 116 is configured to sense the position and orientation of the end effector 10 and the objects 40, 42 in the isolator 112. The sensor device 116 sends sensor signals to the control device 114, wherein the sensor signals include information about the sensed position and orientation of the end effector 10 and the objects 40, 42 in the isolator 112. The control device 114 is adapted to control the robot 100 and the end effector 10 based on the sensor signals.

An exemplary process for handling the first object 40 in the isolator 112 is described below. The control device 114 controls the end effector 10 such that the first receptacle 12 is positioned or moved to the receptacle position 44. The control device 114 controls the robot 100 such that the end effector 10 is moved in the isolator 112 to the position of the first object 40. In particular, the end effector 10 will be moved such that the first object 40 can be received in the first receptacle 12. In other words, the end effector 10 will be moved and aligned in the insulator 112 such that the first object 40 is positioned in the first receptacle 12.

Once the first object 40 is positioned in the first receptacle 12, the control device 114 controls the end effector 10 such that the first receptacle 12 is moved to the grasping position 46 to grasp the first object 40. The control device 114 then controls the robot 100 such that the robot 100 continues to move the end effector 10 in the isolator 112, thereby allowing the first object 40 gripped in the first receptacle 12 to be transferred to a target position in the isolator 112.

Once the target position is reached, the control device 114 controls the end effector 10 such that the first receptacle 12 is moved from the gripping position 46 to the receiving position 44 to release the first object 40. Accordingly, the second object 42 can also be received in the second receptacle 14, gripped, transferred and released again.

Figure 15:
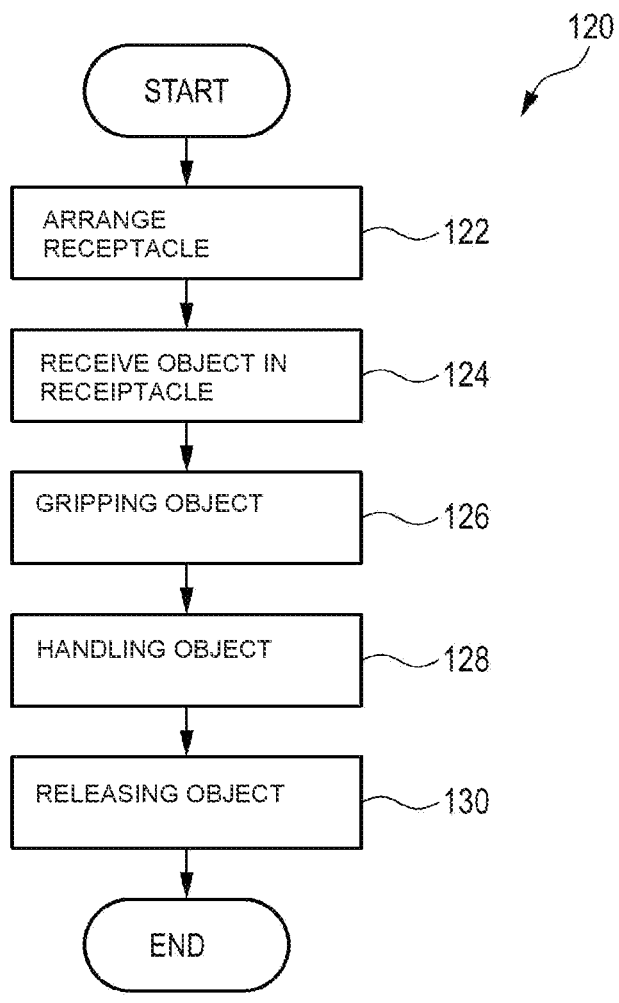
FIG. 15 is a schematic view of an embodiment of a method for handling objects in an isolator.

FIG. 15 shows an embodiment of a method 120 for handling objects 40, 42 in the isolator 112. The method may be performed by the previously described the system 110 of FIG. 14.

In a first step 122 of the method 120, the first receptacle 12 or the second receptacle 14 is arranged in the receiving position 44 in which the first object 40 or second object 42 can be received in the corresponding receptacle 12, 14. If the end effector 10 comprises two first receptacles 12', 12", both first receptacles 12', 12" are arranged in the receptacle position 44.

In a further step 124 of the method 120, the respective object 40, 42 is received in the corresponding receptacle 12, 14. If the end effector 10 comprises two first receptacles 12', 12", a first object 40', 40" can be received in each first receptacle 12', 12".

In a further step 126 of the method 120, the respective object 40, 42 is gripped by displacing the displacement member 16 in such a way that the corresponding receptacle 12, 14 is displaced from the receptacle position 44 to the gripping position 46 in which the respective object 40, 42 can be gripped. If the end effector 10 comprises two first receptacles 12', 12", the two displacement members 16', 16" are displaced in such a way that the first receptacles 12', 12" or the second receptacle 14 are displaced from the receptacle position 44 into the gripping position 46, depending on whether two first objects 40', 40" or a second object 42 are to be gripped.

In a further step 128 of the method 120, the respective object 40, 42 is handled by moving the end effector 10 in the isolator 112 by means of the robot 100 while the respective object 40, 42 is gripped. For example, the end effector 10 may thereby be moved and oriented in the isolator 112 such that the respective object 40, 42 is transferred to a target position.

In an optional step 130 of the method 120, the respective object 40, 42 is released again by displacing the displacement member 16 such that the corresponding receptacle 12, 14 is displaced from the gripping position 46 to the receiving position 44. If the end effector 10 comprises two first receptacles 12', 12", the two displacement members 16', 16" are displaced in such a way that the first receptacles 12', 12" or the second receptacle 14 are displaced from the gripping position 46 into the receiving position 44, depending on whether two first objects 40', 40" or a second object 42 are to be released.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. An end effector for handling objects in an isolator, comprising: a first receptacle for a first object, a second receptacle for a second object, and a displacement member, wherein the first and second receptacles are arranged in a longitudinal direction on opposite sides of the end effector, wherein each of the first and second receptacles is displaceable between a receiving position in which the respective object can be received in the corresponding receptacle and a gripping position in which the respective object can be gripped by the corresponding receptacle, wherein each of the first and second receptacles has a first gripping portion, wherein the first gripping portion of the first receptacle is located at a first end of the displacement member and the first gripping portion of the second receptacle is located at an opposite, second end of the displacement member, wherein the displacement member is displaceable such that the first receptacle and the second receptacle can each be displaced between the receiving position and the gripping position, wherein the end effector comprises two first receptacles and two displacement members, wherein, at the first end of each displacement member, the first gripping portion of a respective one of the first receptacles is arranged, wherein the respective first gripping portion and a second gripping portion of the second receptacle are arranged at the second, opposite ends of the displacement members.

2. The end effector of claim 1, wherein the displacement member is displaceable such that when the first receptacle is disposed in the receiving position, the second receptacle is disposed in the gripping position, and when the second receptacle is disposed in the receiving position, the first receptacle is disposed in the gripping position.

3. The end effector of claim 1, wherein the displacement member is displaceable such that when the first receptacle is disposed in the receiving position, the second receptacle is disposed in the receiving position, and when the second receptacle is disposed in the gripping position, the first receptacle is disposed in the gripping position.

4. The end effector of claim 1, wherein each of the first and second receptacles comprises a second gripping portion, wherein the first gripping portion and the second gripping portion are arranged opposite each other in a transverse direction, wherein the longitudinal direction is arranged substantially perpendicular to the transverse direction.

5. The end effector of claim 4, wherein, in the receiving position, the distance between the first gripping section and the second gripping section is such that the corresponding object can be received between the gripping sections.

6. The end effector of claim 4, wherein, in the gripping position, the distance between the first gripping section and the second gripping section is so small that the corresponding object can be gripped between the gripping sections.

7. The end effector of claim 4, wherein the end effector further comprises, for at least one of the first or second receptacles, a bearing member, wherein the second gripping portion of the respective receptacle is arranged at an end of the corresponding bearing member.

8. The end effector of claim 7, wherein the displacement member and the bearing member each have a recess at the respective ends, the recesses forming the respective gripping portions.

9. The end effector of claim 7, wherein the bearing member is rigidly or movably arranged on the end effector.

10. The end effector of claim 9, wherein the bearing member is displaceable, wherein a movement of the bearing member is coupled to the movement of the displacement member, so that when displacing from the receiving position into the gripping position the gripping portions are moved towards each other and when displacing from the gripping position into the receiving position the gripping portions are moved away from each other.

11. The end effector of claim 1, wherein the displacement member is translationally or rotationally displaceable.

12. The end effector of claim 11, wherein the displacement member is displaceable in the transverse direction.

13. The end effector of claim 11, wherein the displacement member is rotatably supported about a first axis of rotation, wherein the first axis of rotation is arranged perpendicular to the longitudinal direction and the transverse direction, wherein the first axis of rotation is arranged between the first end and the second end.

14. The end effector of claim 1, wherein the end effector further comprises a drive device for displacing the displacement member.

15. The end effector of claim 14, wherein the drive device is configured to displace the displacement member in the transverse direction or to rotate the displacement member about the first axis of rotation.

16. The end effector of claim 15, wherein the displacement member is rotatably supported on the end effector about the first axis of rotation by means of a first coupling member, the first coupling member having a first toothed portion, the drive device having a drive shaft engaged with the first toothed portion.

17. The end effector of claim 16, wherein a bearing member is rotatably supported on the end effector about a second axis of rotation by means of a second coupling member, the second coupling member having a second toothed portion, wherein the drive shaft is engaged with the second toothed portion.

18. The end effector of claim 1, wherein the end effector comprises a respective bearing member for each first receptacle, wherein the second gripping portion of the respective first receptacle is arranged at one end of the corresponding bearing member.

19. The end effector of claim 1, wherein the end effector comprises one drive device each for displacing a respective one of the displacement members.

20. The end effector of claim 1, wherein the end effector comprises at least one spring member arranged to bias the first receptacle and/or the second receptacle into the gripping position.

21. A robot for handling objects in an isolator, comprising: an end effector, wherein the end effector comprises a first receptacle for a first object, a second receptacle for a second object, and a displacement member, wherein the first and second receptacles are arranged in a longitudinal direction on opposite sides of the end effector, wherein each of the first and second receptacles is displaceable between a receiving position in which the respective object can be received in the corresponding receptacle and a gripping position in which the respective object can be gripped by the corresponding receptacle, wherein each of the first and second receptacles has a first gripping portion, wherein the first gripping portion of the first receptacle is located at a first end of the displacement member and the first gripping portion of the second receptacle is located at an opposite, second end of the displacement member, wherein the displacement member is displaceable such that the first receptacle and the second receptacle can each be displaced between the receiving position and the gripping position, wherein the end effector comprises two first receptacles and two displacement members, wherein, at the first end of each displacement member, the first gripping portion of a respective one of the first receptacles is arranged, wherein the respective first gripping portion and the second gripping portion of the second receptacle are arranged at the second, opposite ends of the displacement members.

22. The robot of claim 21, wherein the robot comprises a support structure for supporting the end effector.

23. The robot of claim 22, wherein the end effector is rotatably supported at one end of the support structure.

24. A system, comprising: an isolator and a robot disposed in the isolator, wherein the robot comprises an end effector, wherein the end effector comprises a first receptacle for a first object, a second receptacle for a second object, and a displacement member, wherein the first and second receptacles are arranged in a longitudinal direction on opposite sides of the end effector, wherein each of the first and second receptacles is displaceable between a receiving position in which the respective object can be received in the corresponding receptacle and a gripping position in which the respective object can be gripped by the corresponding receptacle, wherein each of the first and second receptacles has a first gripping portion, wherein the first gripping portion of the first receptacle is located at a first end of the displacement member and the first gripping portion of the second receptacle is located at an opposite, second end of the displacement member, wherein the displacement member is displaceable such that the first receptacle and the second receptacle can each be displaced between the receiving position and the gripping position, wherein the end effector comprises two first receptacles and two displacement members, wherein, at the first end of each displacement member, the first gripping portion of a respective one of the first receptacles is arranged, wherein the respective first gripping portion and a second gripping portion of the second receptacle are arranged at the second, opposite ends of the displacement members.

25. The system of claim 24, wherein the system comprises a control device adapted to control the movement of the end effector.

26. A method for handling objects in an isolator, wherein a robot having an end effector is disposed in the isolator, the end effector having a first receptacle for a first object, a second receptacle for a second object, and a displacement member, wherein the first and second receptacles are disposed on opposite sides of the end effector in a longitudinal direction, wherein each of the first and second receptacles has a first gripping portion, wherein the first gripping portion of the first receptacle is disposed at a first end of the displacement member and the first gripping portion of the second receptacle is disposed at an opposite, second end of the displacement member, wherein the displacement member is displaceable, wherein the end effector comprises two first receptacles and two displacement members, wherein, at the first end of each displacement member, the first gripping portion of a respective one of the first receptacles is arranged, wherein the respective first gripping portion and a second gripping portion of the second receptacle are arranged at the second, opposite ends of the displacement members, the method comprising the steps of:

arranging the first receptacle or the second receptacle in a receiving position in which the first object or the second object can be received in the corresponding receptacle;

receiving the respective object in the corresponding receptacle; and gripping the respective object by displacing the displacement member in such a way that the corresponding receptacle is displaced from the receptacle position into a gripping position in which the respective object can be gripped.

27. The method of claim 26, wherein the method further comprises the step of:

handling the respective object by moving the end effector by means of the robot in the isolator while the respective object is gripped.

28. The method of claim 26, wherein the method further comprises the step of:

releasing the respective object by displacing the displacement member in such a way that the corresponding receptacle is displace from the gripping position to the receiving position.

* * * * *